United States Patent [19]

Lemche

[11] Patent Number: 4,820,224

[45] Date of Patent: Apr. 11, 1989

[54] METHOD AND APPARATUS FOR THE ASSEMBLY OF PICTURE SCREEN DEVICES

[75] Inventor: Josef Lemche, Munich, Fed. Rep. of Germany

[73] Assignee: Siemens Aktiengesellschaft, Berlin and Munich, Fed. Rep. of Germany

[21] Appl. No.: 14,436

[22] Filed: Feb. 13, 1987

[30] Foreign Application Priority Data

Feb. 14, 1986 [DE] Fed. Rep. of Germany ....... 3604626
Feb. 14, 1986 [DE] Fed. Rep. of Germany ....... 3604647

[51] Int. Cl.[4] ............................................. H04N 5/645
[52] U.S. Cl. ..................................... 445/23; 358/248
[58] Field of Search ................. 29/281.3, 238; 445/23; 358/248

[56] References Cited

U.S. PATENT DOCUMENTS

| | | | |
|---|---|---|---|
| 2,094,043 | 9/1937 | Marshall | 29/238 X |
| 3,708,145 | 1/1973 | Pestka | 358/248 X |
| 4,150,477 | 4/1979 | Orr | 29/238 X |
| 4,360,838 | 11/1982 | Babicz et al. | 358/248 |
| 4,593,227 | 6/1986 | Bruce et al. | 358/248 X |

FOREIGN PATENT DOCUMENTS

| | | |
|---|---|---|
| 2112802 | 10/1971 | Fed. Rep. of Germany ...... 411/512 |
| 2648090 | 4/1978 | Fed. Rep. of Germany . |
| 2708106 | 8/1978 | Fed. Rep. of Germany . |

Primary Examiner—Kenneth J. Ramsey
Attorney, Agent, or Firm—Hill, Van Santen, Steadman & Simpson

[57] ABSTRACT

A method and apparatus for assembling picture screen devices is disclosed having mounting parts consisting of a bezel and carrying frame having lateral centering surfaces for the guidance of the picture tube whereby the bezel is first placed into a molding dish. Then, the picture tube is placed into this bezel and the carrying frame, which completes the mount of the picture tube, is placed over the back of the picture tube. Subsequently, the two mounting parts are pressed against one another with a prescribed pressure and are fixed by fastening means arranged in a distributed fashion around the periphery of the picture tube.

7 Claims, 5 Drawing Sheets

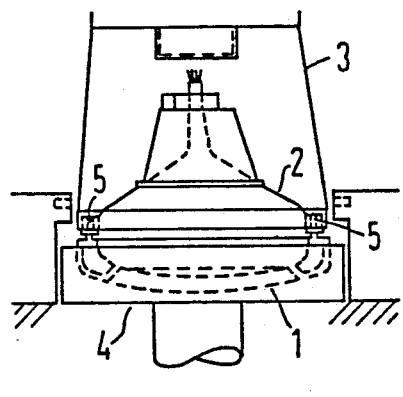
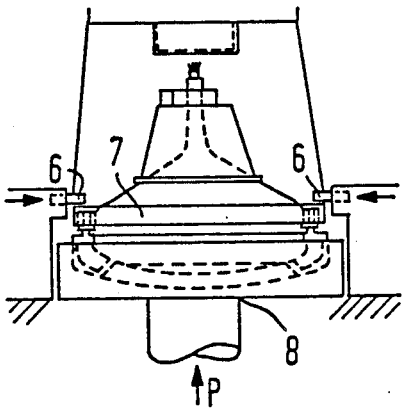
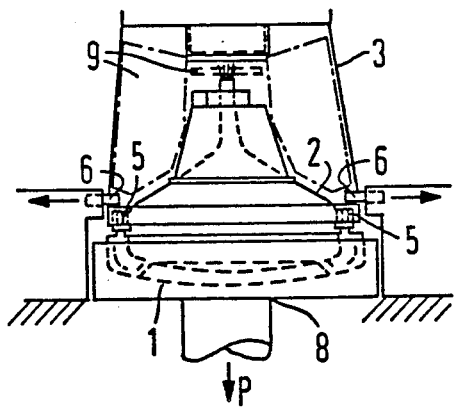

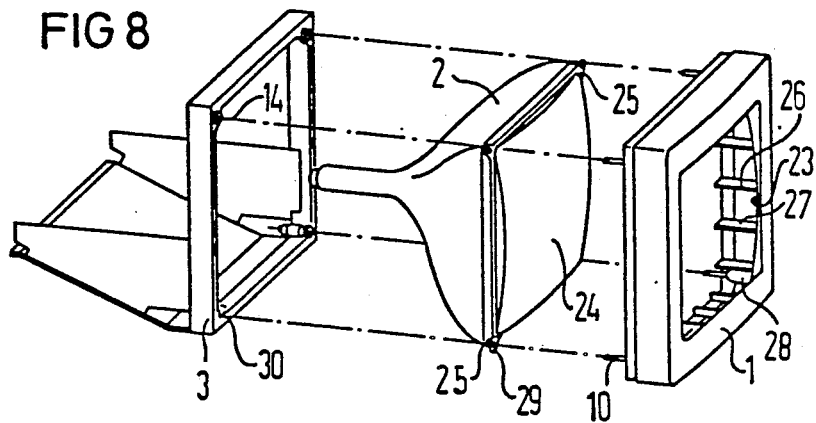
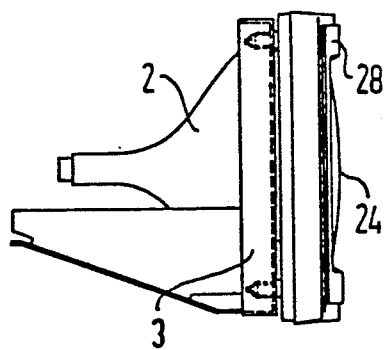
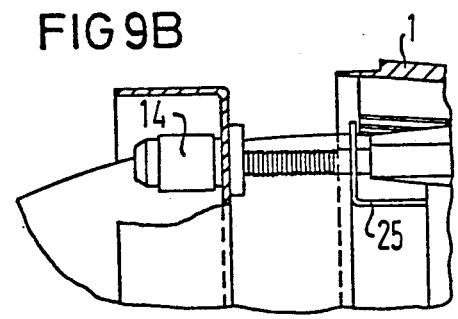
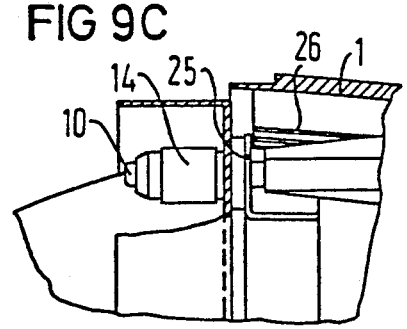

METHOD AND APPARATUS FOR THE ASSEMBLY OF PICTURE SCREEN DEVICES

BACKGROUND OF THE INVENTION

The invention is directed to a method for the assembly of picture screen devices, and in particular to a method using a clamp connection and a mount for a picture tube.

At present, many time-wasting, small, individual steps, part of which are exclusively manual tasks, are carried out on a carrier element in the assembly of a picture tube and its corresponding viewing window. Among other things, the demand that the inside edge of the viewing window bezel lie flush against the spherical picture screen surface of the picture tube on all sides presents great difficulties.

In order to meet this demand, one known assembly method employs spacer pins which are first screwed into a picture tube carrying frame which is then placed in an assembly jig. The bezel is then pressed against the front of the picture tube, which is held by the spacer pins, until claws which are attached to the sides of the diaphragm engage and retain the carrying frame with the picture tube in between. Due to loose manufacturing tolerances of the glass member of the picture tube, however, the claws either do not properly engage the pins of the carrier or the bezel is loosely seated around the picture tube. Re-adjustment must therefore be undertaken with the spacer pins. To accomplish this the bezel must be removed again so that all screws and nuts fixing the picture tube and the spacer pins can be loosened. After the spacer pins have been appropriately adjusted and all nuts have been tightened again, the bezel is put back in place and a check of the spacing between the inside edge of the bezel and the spherical picture screen surface of the picture tube is once again carried out. This time-consuming adjusting procedure may have to be carried out repeatedly until proper engagement is obtained. Work facilitating accessories such as, for example, assembling jigs are usually employed for individual work steps and industrial robots are also utilized for various activities during assembly. As a consequence of the unfavorable structure of both the holding device and the picture tube, however, the complete assembly of picture screen devices by an industrial robot is difficult, especially when the demand that the inside edge of the viewing window bezel press flush against the picture screen surface on all sides is taken into consideration.

SUMMARY OF THE INVENTION

It is therefore an object of the present invention to provide an improved method of assembling picture tubes whereby the complete assembly of picture screen devices can be carried out by an industrial robot with the afore-mentioned demand in consideration and which may be carried out independently of the manufacturing tolerances of the glass member of the picture tube with a minimal amount of work.

This object can be achieved by first guiding and centering the picture tube into the bezel by using lateral centering surfaces which are formed on an inside edge of the bezel and contact the different curvatures of the picture screen surface and then placing a carrier frame over the rear neck portion of the picture tube. Alternatively, this sequence can be reversed with the picture tube neck being placed within the carrying frame having lateral centering surfaces and the bezel being placed over the face of the picture tube. This provides an extremely simple assembly sequence that can be executed by automation or robotics without any further assembly being required. Additionally, the picture tube is pressed against the bezel with a prescribed amount of pressure which simultaneously permits latching clamp connections to be brought into engagement which secure the picture tube and carrier to the bezel.

An especially advantageous feature of the present invention is the combination of the above desired sandwich structure with self-engaging clamp connections, whereby the bezel lies at the bottom and the carrier frame lies at the top of the assembly. With this arrangement, further fitting of the remaining structural units and electrical components of the picture screen device can be carried out on the carrier and the neck of the picture tube in this position.

The invention further discloses unique push-on clamp connections. Such clamp connections are known and offer special advantages in assembling because they enable the mutual fastening of two parts by simply sliding or pressing a counter-element onto a corresponding retaining element. For example, German published application OS No. 27 08 106 and German published application OS No. 26 48 090 disclose connection mechanisms wherein planar or pre-arched clamp elements are composed of a spring sheet and comprise inwardly directed spread tabs which are used for fastening movable or stationary parts onto an axle or shaft. When slipped on, the spread tabs spread outward toward the back, and grab onto the surface of the axle or shaft when an attempt is made to pull the clamp element off. In order to intensify the holding force, the surface of the axle or shaft can be provided with a sawtooth type profile.

The advantages of such a push-on fastener or fast-fixing device over fastening with screws and nuts lie in the simple manipulation and the savings in time and costs connected therewith. A disadvantage of these fasteners or clamp elements, however, is that due to their non-solid, hollow structure they exert only a relatively slight retaining force against a pull-off force acting on them in axial direction. They have therefore been unsuitable for fastening heavy parts such as a carrier element of the picture tube.

The clamp connection that is disclosed herein is especially advantageous for the assembly of picture screen devices, is simple to manipulate and can be quickly applied, but which is more durable and well-suited for fastening heavy parts to a carrier element. The preferred embodiment discloses such a clamp connection which is particularly composed of a pin having a plurality of sawtooth edges which annularly surround the pin and enter into engagement with an inside surface of a core hole. Such a clamp connection provides a high retaining force against pull-off.

An advantageous feature of the present clamp connection is that the clamp element is fashioned as a fastening bush and is provided with a reduced diameter and a sawtooth profile in at least one sub-region of its core hole. This sawtooth profile is similar to the sawtooth profile which is applied to the pin. The direction of the sawteeth within the core hole and on the pin is such that the sawteeth slide off one another when the clamp element is slipped onto the pin and the sawteeth engage one another when the clamp element is pulled away from the pin. In comparison to a clamp element comprising a smooth core hole, the present design provides a significant increase in the retaining force of the clamp element on the pin.

As a consequence of the mutual sliding of the sawteeth when the clamp element is slipped onto the pin, a spreading effect arises inside the core hole. This spreading effect is compensated for by cutting the fastening bush open on one side in an axial direction. The two half shells of the fastening bush formed after cutting are connected to one another by a thin band acting like a hinge on the side away from the cut and are held together resiliently on the side of the bush opposite the hinge by a cylindrical spring clamp which is slipped on in an axial direction. The fastening bush can thus yield to the radially outwardly acting spreading force while guaranteeing a complete interlocking of the sawtooth profiles. Moreover, after the cylindrical spring clamp has been pulled off, the clamp element can be hinged open and the clamp can be detached without damage to any of the parts.

Normally, when the two bush halves are folded together, a wedge-shaped gap is formed between these halves by the thin band connecting the two halves. This gap skews the two bush halves which prevents the cross-sections of the clamp element and the core hole from being perfectly circular. Under these conditions, the main load in both the interlock position as well as when the sawteeth slide past one another is concentrated at the two ends of the hemispherical sawtooth edges of each bush half. Therefore, cold flow of the material due to these concentrated stresses can produce a smearing or deformation of the grooves of the sawtooth profile at these end points. This can be avoided by flattening the two bush halves at their intersecting surfaces so that a constantly wide gap arises between them. This design thereby provides a circular cross-section for the core hole of the bush halves which now permits the sawteeth of the bush to press against the pin parallel to and opposite one another, whereby a uniform distribution of the load over the circumference of the sawteeth is achieved.

However, since the ends of the circular-segmented sawteeth are significantly more sensitive and resilient than their central region, the risk of smearing or deforming the grooves of the sawteeth continues to exist during insertion of the fastening bush onto the pin. An optimum meshing of the sawteeth of the fastening bush and of the pin is thus not assured. This problem can be avoided by enlarging the central radius of the core hole relative to the pin radius without modifying the draft of the clearances or radius at in the ends of the bush halves. With this modification, the core hole has an elliptical cross-section whose smaller central ellipse diameter corresponds to that of the pin. As a result, the pressure on the sensitive ends of the circular-segmental sawteeth is reduced and is concentrated on the more stable central region of the bush and cold flow is therefore prevented.

Furthermore, fashioning the sawtooth profile in only a sub-region of the core hole of the bush has the advantage that the retaining force of the clamp element or pin exists only within the sub-region. As a result, only a certain insertion pressure is required during pressing in order to bring all sawteeth present in the sub-region into engagement with the sawteeth of the pin.

By providing a symmetrical channel and flange to one exterior end of the fastening bush, the fastening bush can be introduced and anchored in slots of one of the parts to be connected, (i.e. the carrier or the bezel,) whereby the clamp element becomes an integral component of this part. By simultaneously pressing against this part, a large flange area is provided which provides stability against tilting or skewing of the clamp element or bush.

In contrast to known picture tube mounts wherein the picture tube is secured with screws to spacer pins which are in turn screwed into a carrying frame and the picture tube is pressed against a bezel that has latch claws which engage the carrier frame, the present mount is fashioned so that no readjustment is required during assembly while the inside edge of the bezel cutout presses flush against the spherical picture screen surface of the picture tube on all sides.

The present mount can provide these features since the picture tube is no longer directly secured to the carrying frame with screws, but is freely held by retaining or fastening clips on the tube itself which are in turn clamped between the carrying frame and bezel. The positioning of the picture tube is accomplished by lateral centering surfaces on the interior edge of the bezel or the carrying frame. The picture tube is clamped so that the inside edge of the bezel cutout presses against this spherical surface of the picture tube which has its retaining clips pressing against the carrying frame without having the bezel touch the carrying frame itself. The contact pressure required for this purpose is produced by the clamp connections described previously.

The mount of the present invention is also designed so that the radius of curvature of the inside edge of the bezel cutout is greater than the radius of curvature of the spherical picture screen surface and the individual clamp connections are arranged in the corner regions of the bezel cutout or, respectively, of the carrying frame. As a result, the inside edge of the bezel cutout can be placed flush against the spherical picture screen surface of the picture tube, including the middle of each and every side as well as the corners, due to the deformation of the bezel when the clamp connections are pressed. This is true even when different curvatures of the spherical picture screen surface that are production oriented are present. The bezel thus participates in the fastening of the picture tube as an active component.

BRIEF DESCRIPTION OF THE DRAWINGS

The individual method steps in the assembly of picture screen devices as well as exemplary embodiments of the clamp connections and of the mounts of the invention that are thereby employed shall be set forth in greater detail below with reference to the drawings wherein:

FIG. 1 is a front plan view of a press-in station for the assembly of picture screen devices with a bezel, picture tube and chassis being inserted on top of one another;

FIG. 2 is a front plan view of the press-in station, similar to FIG. 1, illustrating the pressing condition;

FIG. 3 is a front plan view of the press-in station, similar to FIG. 1, after the cancellation of the pressing condition;

FIG. 8 is an exploded perspective view of a mount of the present invention for a picture screen device;

FIG. 9A is a side plan view of the mount of FIG. 8 in its assembled condition with a fragmented view of the connection clamp;

FIG. 9B is a partial magnification of the mount of FIG. 9A in its non-assembled condition illustrating the bush and pin in greater detail;

FIG. 9C is a partial magnification of the mount of FIG. 9A in its assembled condition;

DESCRIPTION OF THE PREFERRED EMBODIMENT

Figure 4A:
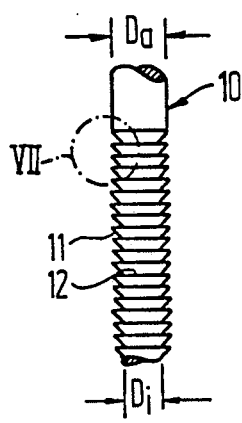
FIG. 4A is a plan view of a pin of the clamp connection of the present invention.

The method for assembling picture screen devices on which the invention is based is generally incorporated in FIGS. 1 to 3 and basically comprises three steps.

In the first step shown in FIG. 1, the parts to be connected, bezel or escutcheon 1, picture tube 2 and carrying frame or chasis 3, (shown in an exploded view in FIG. 8,) are successively placed into a press-in station stacked on top of one another in this sequence by automation. With its front side down, the bezel 1 thereby lies in a mould dish 4. This molding dish 4 is fashioned so that the bezel contacts the moulding dish 4 only with its edge regions. With its picture screen surface likewise facing down, the picture tube 2 is placed into the shaft or viewing opening formed in the bezel 1 by the external lateral centering faces of the bezel 1. The carrying frame 3, finally, lies on the retaining clips 25 of the picture tube 2 without directly contacting the bezel 1. The clamp connection elements 5 attached to the bezel 1 and to the carrying frame 3 and directed toward one another, thereby engage one another without initially latching.

In the second step illustrated in FIG. 2, horizontally disposed stop pins 6, laterally arranged in the area of the clamp connection elements 5, are drawn out of the press-in station. These stop pins 6 are laterally pushed over retaining surfaces 7 of the carrying frame 3 and comprise counter-pressure points or holding fingers at these locations, so that the carrying frame 3 is fixed in an upward direction. Subsequently, a pressure P is exerted on the molding dish 4 from the bottom to the top in a vertical direction. The molding dish 4 is thereby part of the ram 8 and presses the bezel 1 against the carrying frame 3, which is retained by the stop pins 6, and clamps the picture tube 2 situated between bezel 1 and carrying frame 3 by clamp connections 5. When the parts are joined, the bezel 1 is pressed against the picture screen surface of the picture tube 2 so that it adapts to the curvature of the picture screen surface by a slight deformation. This assures that the inside edge of the bezel cut-out is seated flush on all sides of the picture tube 2 regardless of tolerance fluctuations of the glass member of the picture tube. The contact pressure during joining can, for example, amount to 5000 N.

In the last method step illustrated in FIG. 3, the pressing condition is in turn cancelled and the molding dish 4 is relieved. Moreover, the stop pins 6 are returned to their initial position. Bezel 1, picture tube 2 and carrying frame 3 have now been firmly joined to form a single unit. In this position, the other electrical subassemblies 9 such as, for example, monitor, transducer and video subassemblies can be inserted and the calotte and pedestal can be attached. Carlotte, as used herein, means hood or cover. The picture screen device is then completely assembled.

Taking necessary structural changes of the press-in station into consideration, the above-described assembly method that is preferably employed can be modified by means of a corresponding design and programming of the automation members as well as by means of other, necessary measures. For example, the sequence of the insertion of the parts to be connected can be reversed and the contact pressure can be exterted from top to bottom. Additionally, screw connection elements can also be employed instead of the clamp connection elements, but this again means an additional technological outlay because of the machine-executed screwing. It would also be conceivable to employ the clamp or, respectively, screw connection elements in combination with hinges. Insofar as these are not hook-in hinges, however, a modified method sequence would exist where bezel 1 and carrying frame 3 are simultaneously placed into the assembly retainer upon formation of an aperture angle and the picture tube 2 is subsequently placed between the bezel 1 and carrying frame 3 through the aperture and the aperture is closed. The pressing of the parts then ensues in a known way with the special characteristics that, due to the structural design of the automation members, the pressing pressure acts only at the locations of clamp connection elements 5.

Figure 7:
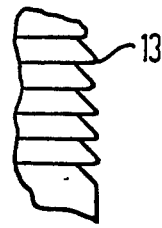
FIG. 7 is a partial view of the pin of FIG. 4A illustrating the sawteeth in greater detail.

The end region of the pin of the clamp connection 5 of FIG. 1 is illustrated in FIG. 4A. This pin 10 comprises a series of grooves 11 that are formed by disks 12 which are parallel to one another and have conical outside surfaces which define a sawtooth profile. The outer sawtooth edges 13 as illustrated in FIG. 7 are preferably slightly rounded. The spacing between the individual sawteeth preferably amounts to 1.2 mm and the slant of the sawtooth sidewalls preferably lies at 45°. The head part (not shown) of the pin 10 can comprise a large-area, circular face flange or two channels lying parallel to one another which extend around the circumferance of the pin 10. For easier introduction into an opening, the tip of the pin 10 (not shown) may have a wedge-like shape provided with rounded edges.

Figure 4B:
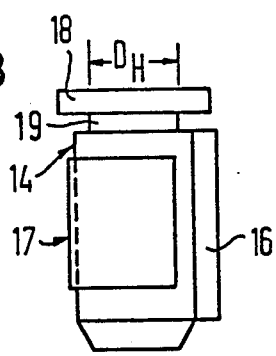
FIG. 4B is a front plan view of a clamp element of the clamp connection of the present invention.
Figure 4C:
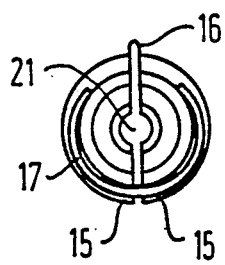
FIG. 4C is a bottom plan view of the clamp element of FIG. 4B.
Figure 5A:
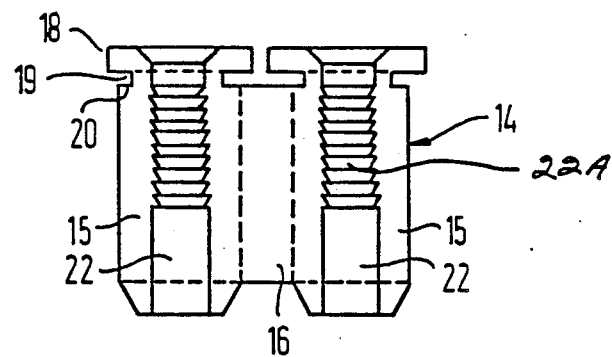
FIG. 5A is a plan view of the clamp element of FIGS. 4B and 4C in the hinged-open position.
Figure 5B:
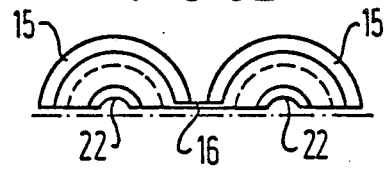
FIG. 5B is a bottom plan view of the hinged-open clamp element of FIG. 5A.

The clamp element of the clamp connection 5 of FIG. 1 which is shown in detail in FIGS. 4B and 4C is composed of an oblong, cylindrical fastening bush 14 divided in an axial direction whose halves 15 are connected to one another at one side by a thin band 16 acting like a hinge. Furthermore, a cylindrical spring clamp 17 is slipped onto the bush 14 in an axial direction and has a slot that holds the two bush halves 15 resiliently together. Together, the two bush halves 15 and the band 16 joining them, form a unified structural part of the same material, as FIGS. 5A and 5B illustrate. The material can be plastic, for example polyamide, or aluminum. In comparison thereto, the pin 10 of FIG. 4A is composed of a significantly harder material. The clamp element can be manufactured in a diecasting molding method for cost reduction.

A circumferential channel or grove 19 having a circular face flange 18 is provided at one end of the fastening bush 14 as illustrated in FIG. 4B which is cylindrical in its folded condition. The channel 19 allows the fastening bush 14 of the clamp element 5 to be inserted into slots or channels of one of the parts to be connected and to retain it so that it cannot slide out of the slots even when this part is turned or tilted. The clamp element 5 is thereby fixed in an axial direction and can therefore be axially loaded. The clamping effect is achieved by the proper selection of the width of the channel or slot. When clamping is achieved due to this slot width, the clamp element 5 can only move in a straight line within the slot perpendicular to the axial direction, provided the slot width is somewhat greater than the neck diameter $D_H$ of the channel 19. This is especially advantageous when the position of the entering pin 10 is not exactly defined. It is to be noted that the present design of the slot width prevents the fastening bush 14 from falling laterally out of the slots and that the pressure faces of the supporting shoulders 20 shown in FIG. 5A are always large enough so that adequate strength of the connection is assured.

The large-area face flange 18, whose back side lies flat against a cooperating surface within the channel 19, stabilizes the fastening bush 14 against tilting in case a torque is exerted on the clamp element 5. This stabilizing is obtained since bearing and pivot points in the channel 19 act on the inserted pin 10 perpendicular to its axial direction.

The fastening bush 14 of the clamp element 5 can be designed in various ways. The fastening bush 14 of the present invention is shown divided in two in the drawings. For some applications, however, a single-piece design of the fastening bush 14 would be conceivable having a core hole 21 that, at least in a sub-region thereof, has a diameter that is slightly reduced in comparison to the pin diameter $D_a$. Other designs are possible which incorporate the simple halving of the fastening bush 14 with a slipped-on spring clip 17 and the formation of a sawtooth profile in at least a sub-region within the core hole 21 without departing from the teachings of the present invention.

The preferred embodiment of the fastening bush 14 is depicted in the drawings. As may be derived from FIGS. 4C and 5B, the bush halves 15 are flattened at their cut face to such a degree that the bush halves 15 when lying parallel to one another in their hinged-in condition form a gap between them and define a core hole 21 having a cross-section that is circular overall. The gap is thereby enclosed at one end by the band 16 which is bent around a finite radius. The core hole 21 is formed with a recess 22 shown in FIGS. 5A and 5B which is introduced into the inside of the bush halves 15. Sawtooth profiles 22A that are matched to the sawtooth profile on the pin 10 are present within a sub-region of the shell-shaped recesses 22. In many instances, formation of the sawtooth profiles 22A in one sub-region of the core hole 21 suffices. The remaining regions are then provided with an enlarged diameter that is at least as large as the diameter $D_a$ of the pin 10.

Figure 6:
FIG. 6 is a schematic illustration of a pin within a clamp element in the groove region of the respective parts illustrating the elliptical design of the clamp element.

The radii of the recess 22 and, thus, the radii of the sub-regions comprising the sawtooth profiles 22A, can be larger than the radius of the pin 10 without thereby changing the draught of the recesses 22 as illustrated in FIG. 6. By enlarging the central radii of the recesses 22, the core hole 21 obtains an elliptical cross-section overall whose smaller, central ellipse diameters $D_{Ei}$ and $D_{Ea}$ are matched to the pin diameters $D_i$ and $D_a$ of FIG. 4A in the groove region. Due to this design, the sawteeth of the pin 10 contact the sawtooth profiles 22A of the recesses 22 at the central region of the recesses 22 and concentrate stress in this area. The ends of the bush cross-section at the hinge 16 and cut faces are thereby relieved.

FIG. 8 illustrates an exploded view of a mount for the picture tube 2, designed according to the teachings of the present invention. The picture tube 2 is clamped between the carrying frame 3 and the bezel 1 whereby the inside edge 23 of the diaphragm cutout presses against the spherical picture screen surface 24 of the picture tube 2 which, having fastening clips 25 which lie against the face flange 18 of the clamp element 5, in turn presses against the carrying frame 3. The bezel 1 thereby does not directly touch the carrying frame 3.

The picture tube 2 is centrically guided into the bezel 1 by centering surfaces 26 arranged at the lateral inside edges of the bezel 1. These centering surfaces 26 are composed of ribs 27 which reside perpendicular to the outer limiting surfaces of the picture tube 2 and form a guide shaft for the picture tube 2. These centering surfaces 26 could also be employed on the carrying frame 3 to provide the necessary centering of the picture tube 2. The radius of curvature of the inside edge 23 of the bezel cutout is slightly larger than the radius of curvature of the picture screen surface 24. When the three parts are joined, the centers of all four sides of the inside edge 23 of the bezel cutout press flush against the picture screen surface 24 and, due to a slight deformation of the bezel 1, the regions lying next to the centers then follow. A flush seating of the inside edge 23 of the bezel cutout against the picture screen surface 24 is always achieved with these measures regardless of fluctuations in the curvature of the picture screen surface 24 which may occur due to manufacturing tolerances of the glass member of the picture tube 2. The deformation of the bezel 1 normally is so slight that it cannot be perceived with the naked eye. In addition to a resistive spring force provided by the fastening clips 25, however, the deformation of bezel 1 provides an added increase in the pre-stress which is to be overcome by the clamp connections which are respectively arranged in the corner regions 28 of the bezel 1. This pre-stress remains constant due to the sawtooth mechanism of the clamp connection. Overall, the mount of the picture tube is so firm that it meets very high demands.

Due to the arrangement of the clamp connection elements 5 in the corner regions 28 of the bezel 1, the pins 10 engage through openings 29 of the fastening clips 25 of the picture tube 2 which can be dimensioned to accommodate the different products of various companies. Other positions for the clamp connection elements 5 are possible given a corresponding curvature of the inside edge of the bezel 1. For example, the clamp connection elements 5 can be arranged so that they act in the central regions of the bezel 1. However, the curvature of the inside edge 23 of the bezel cutout must then be smaller with reference to the curvature of the picture screen surface 24.

Figure 10:
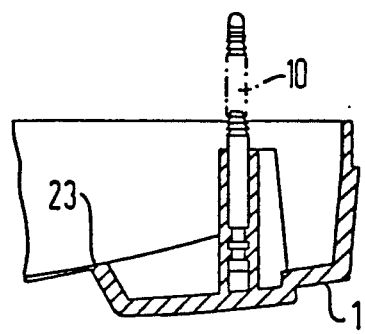
FIG. 10 is an illustration of a first embodiment of an anchoring method for the pin within the bezel.
Figure 11:
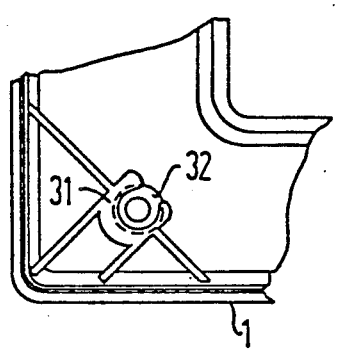
FIG. 11 is an illustration of a second embodiment of an anchoring method for the pin within the bezel.
Figure 12A:
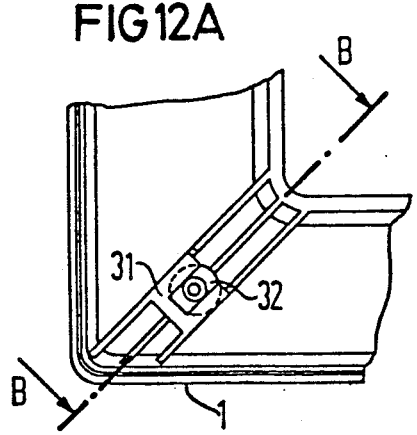
FIG. 12A is a top plan view of the bezel illustrating a third embodiment of an anchoring method for the pin within the bezel.
Figure 12B:
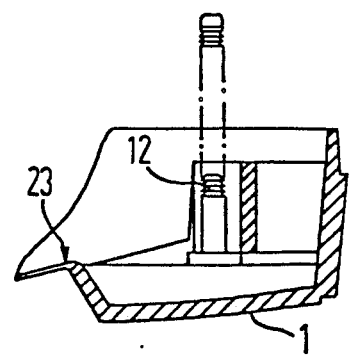
FIG. 12B is a cross-sectional view of the bezel of FIG. 12A, taken along lines B—B of FIG. 12A.

The carrying frame 3 can be within a housing or can be fashioned in the form of a chassis. The fastening bushes 14 can have their channels 19 inserted into slots 30 in the carrying frame 3 and are clamped by an appropriate selection of the slot or channel width. These slots 30 are diagonally directed toward the center of the picture screen and are open in this direction to permit insertion of the fastening bushes 14. The pins 10 are anchored in the bezel 1. The anchoring of the pins 10 can be rigid as depicted in FIG. 10 or moveable as FIGS. 11, 12A and 12B illustrate.

Given the rigid anchoring, the pin 10, for example, is pressed into a retaining shaft present within the bezel 1 using ultrasound techniques commonly known in the art. Alternatively, the moveable anchoring pin can be modified to conform to a snap-in mechanism shown in FIG. 11 and/or a rail mechanism shown in FIGS. 12A and 12B comprising a respective receptacle 31 and opening 32 for the pin 10. With the rigid anchoring of FIG. 10, the head side of the pin 10 lies between two channels lying parallel to one another which encircle the pin. With the snap-in and/or moveable anchoring of FIGS. 11 or 12A and 12B, the head side comprises a flange which only prevents it from being pulled from the anchorings in an axial direction. The rail-like arrangement of FIGS. 12A and 12B enables the pin to be moved along a straight line diagonal to the center of the picture screen, while the snap-in mechanism of FIG. 11 enables movement toward the circular opening 32 due to the circular opening (32) having a larger diameter than the pin core diameter $D_a$ but a smaller diameter than the flange diameter.

The pin 10 can be introduced into the anchorings through lateral openings 32 that point toward the center of the picture screen. The opening 32 of the snap-in anchoring of FIG. 11 is thereby somewhat smaller than the pin core diameter $D_a$, the characteristic snap effect being thereby achieved.

For the selection of the proper spacing of the sawteeth of the sawtooth profiles of pin 10 and fastening bush 14, the manufacturing tolerances of the picture tube 2, of the carrying frame 3 and of the bezel 1 which influence the clamp connection are added up and the spacings are then selected smaller than the sum of the tolerances. In this way, the clamp connection elements 10 and 14 engage within the maximum range of tolerance, the effective range of tolerance thereby becoming smaller.

While particular embodiments of the present invention have been shown and described in detail, modifications may be made without departing from the teachings of the present invention. Accordingly, the scope of the invention is only to be limited as necessitated by the accompanying claims.

I claim:

1. In a method for assembling picture screen devices whereby a picture tube having a spherical picture screen surface and retaining clips arranged at the outer circumference thereof is arranged between a closed carrying frame and a frame-like bezel with lateral centering surfaces disposed on the interior of said bezel and with an inside edge mount which is adaptable to the curvature of the spherical picture screen surface of the picture tube and defines the frame cutout of the bezel on all sides thereof, the improvement comprising:

centrally locating the front face of said picture tube with respect to said bezel;
placing said carrying frame over the rear face of said picture tube;
pressing said bezel against said carrying frame with a prescribed amount of pressure; and
affixing said carrying frame to said bezel with a plurality of fastening means, having first and second clamp elements, to and around said carrying frame and bezel, whereby said first and second clamp elements are capable of engaging one another to accomplish affixing during the pressing process.

2. The method according to 1 further comprising:
stacking said bezel, said picture tube and said carrying frame, said bezel and said carrying frame having first and second clamp elements on top of one another in a molding dish of a press-in station; and
securing said carrying frame against vertical movement by stop pins provided in said press-in station that can be laterally pushed over retaining surfaces of said carrying frame, whereby said bezel together with said picture tube are pressed with a prescribed pressure against said carrying frame with said molding dish fashioned as a ram until said first and second clamp elements lock in pursuance of the stop pins before said ram and said stop pins return to their initial position.

3. A mount for a picture tube having a spherical picture screen surface and a plurality of fastening clips arranged at the outer circumference of said picture tube, said mount comprising:
a closed carrying frame;
a frame-like bezel having an inside edge matched to the curvature of said spherical picture screen surface of said picture tube and which defines the frame cutout of the picture tube, and having a plurality of lateral centering surfaces; and
press-on type clamp means engaging said fastening clips for simultaneously fastening said carrying frame to said bezel with said picture tube therebetween and pressing said carrier frame, said picture tube and said bezel together in assembled relation, said picture tube being guided in said bezel by said lateral centering surfaces and held by said clamp means by pressure of said inside edge of said bezel against said picture screen surface.

4. A mount according to claim 3 wherein said inside edge of the bezel is arced with a radius that is larger than the radius of the curvature of the picture screen surface of the picture tube.

5. A mount according to claim 4 wherein said centering surfaces are composed of ribs arranged along the circumference of the picture tube, said ribs having an alignment perpendicular to the picture screen surface and being arranged within the bezel.

6. A mount according to claim 4 wherein said clamp means are arranged in the corner regions of the bezel and have pins which pass through openings of the fastening clips of the picture tube.

7. A mount according to claim 6 wherein each of said clamp means has at least one sub-element which is anchored in a receptacle and is moveable at a right angle to the clamping direction, said receptacles having a lateral opening for the insertion of the respective sub-element.

* * * * *